(12) United States Patent
Bittner

(10) Patent No.: US 7,969,695 B2
(45) Date of Patent: Jun. 28, 2011

(54) SUPERCONDUCTING MAGNETIC COIL WITH A QUENCH PROTECTION CIRCUIT, AND MRT APPARATUS EMBODYING SAME

(75) Inventor: Gerhard Bittner, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 447 days.

(21) Appl. No.: 12/097,807

(22) PCT Filed: Nov. 10, 2006

(86) PCT No.: PCT/EP2006/068328
§ 371 (c)(1),
(2), (4) Date: Jun. 17, 2008

(87) PCT Pub. No.: WO2007/073979
PCT Pub. Date: Jul. 5, 2007

(65) Prior Publication Data
US 2009/0002902 A1    Jan. 1, 2009

(30) Foreign Application Priority Data

Dec. 27, 2005  (DE) .......................... 10 2005 062 581

(51) Int. Cl.
*H02H 9/00*   (2006.01)
*H02H 7/00*   (2006.01)
(52) U.S. Cl. .......................................................... 361/19
(58) Field of Classification Search ...................... 361/19
See application file for complete search history.

(56) References Cited

U.S. PATENT DOCUMENTS

| | | | |
|---|---|---|---|
| 3,025,416 A | * | 3/1962 | Johnson ........................ 327/372 |
| 3,242,418 A | * | 3/1966 | Mela et al. ....................... 322/28 |
| 4,689,707 A | | 8/1987 | Schwall |
| 4,807,084 A | * | 2/1989 | Takechi ......................... 361/141 |
| 6,112,531 A | * | 9/2000 | Yamaguchi .................... 62/51.1 |
| 6,147,844 A | | 11/2000 | Huang et al. |

* cited by examiner

*Primary Examiner* — Ronald W Leja
(74) *Attorney, Agent, or Firm* — Schiff Hardin LLP

(57) ABSTRACT

A superconductive magnetic coil arrangement has a superconducting magnetic coil and a circuit for quench protection. The quench protection circuit includes at least one diode connected in parallel with a portion of the superconductive magnetic coil. The at least one diode is in thermal contact with the superconductive magnetic coil A magnetic resonance tomography apparatus embodies such a magnetic coil arrangement.

12 Claims, 3 Drawing Sheets

SUPERCONDUCTING MAGNETIC COIL WITH A QUENCH PROTECTION CIRCUIT, AND MRT APPARATUS EMBODYING SAME

The present invention concerns a superconducting magnetic coil with a circuit for quench protection, as is used in magnetic resonance tomography apparatuses (designated in the following as MRT apparatuses), as well as an MRT apparatus embodying such a magnetic coil.

DESCRIPTION OF THE PRIOR ART

As is known, a magnetic coil made from a superconducting material can be operated in a superconducting state when the magnetic coil is located in a very cold environment such as, for example, in a cryotank filled with liquid helium. In the superconducting state the coil wires has practically no resistance, such that no energy is required to maintain a current flow in the magnetic coil and therefore also to maintain the magnetic field generated by the magnetic coil. The current flow itself is actively fed into the coil during a process known as a charging procedure before start-up of the magnet. Such cryomagnets have found wide use in MRT apparatuses.

An MRT cryomagnet conventionally has multiple superconducting sub-coils connected in series that are spatially separated and are located in a cryotank filled with liquid helium. The cryotank is in turn surrounded by cryoshields for the purpose of cooling and is arranged in a vacuum vessel.

A quench of a superconducting magnet is an event which, for various reasons, causes a portion of the superconducting magnetic coil to lose its superconducting property and become normally-conductive, i.e. conductive with a resistance different from zero.

Due to the non-zero electrical resistance, the current flow in the magnetic coil changes and the magnetic field developed by this current collapses. The collapse of the magnetic field causes a series of events, of which each entails a problem.

Due to the collapse of the magnetic field the energy stored therein is released. In practice the entire energy is transduced into thermal energy, within the normally-conductive regions of the coil wires. If only a small region of the magnetic coil (for example only one sub-coil) is normally-conductive, this can lead to the situation that the released energy in the locally limited region is transduced into thermal energy, which in turn leads to a severe local overheating that can damage components of the cryomagnet. The risk of a local overheating is typically reduced in that given a quench the entire magnetic coil is brought into the normally-conductive state in a controlled manner so that the thermal energy distributes to the entire thermal mass of the magnetic coil.

Moreover, eddy currents that in turn interact with the magnetic field arise due to the changing magnetic field in the magnetic coil and in other conductive components of the MRT apparatus, such that components of the MRT apparatus are exposed to considerable forces. In order to keep lateral displacement forces optimally low, it is attempted to have the dissipation of the magnetic field in a quench occur in an optimally symmetrical manner, i.e. to bring the magnetic coil of the MRT apparatus to quench as symmetrically as possible.

Furthermore, the current flow I changes relatively severely in a short time. High voltages in the magnetic coil are thereby generated with an inductance L according to the correlation $L \cdot (\partial I / \partial t)$. Without further protective measures, these voltage excesses can lead to damage to the coil and/or to the insulation of the coil.

One possibility to avoid problems described above is the use of resistors to control propagation of the quench. Resistors that are typically connected in parallel with the conductor coils are applied over the entire coil, typically in an upper region of the winding. Given a quench that is accompanied with a voltage differing from zero along the conductor wires, current flows through the resistors. Due to their radiant heat they cause the respective next winding to quench. The resistors simultaneously reduce the high voltages arising given a quench. Furthermore, an optimally symmetrical propagation of the quench is achieved via a clever wiring of the resistors.

The use of resistors does in fact solve the problems that can occur in a quench, but the use of resistors also entails disadvantages that predominantly appear during the phase of the charging, and discharging of the magnetic coils. Upon charging a voltage is applied to the magnetic coil, for example to induce the current flow. A portion of this voltage induces a current flow through the resistors, such that an (albeit slight) heating of the resistors occurs which leads to a vaporization of a portion of the helium. In addition to increased costs due to the vaporized helium, quenches can also occur. Although the heating can be reduced by using higher-impedance resistors, the use of higher-impedance resistors in turn holds the danger of higher voltage excesses given a quench.

In cryomagnets of the Helicon type as have been produced by the Siemens Corporation, this problem is circumvented by connecting cold diodes in parallel and anti-parallel with the sub-coils instead of resistors. A cold diode means a diode (for example a silicon diode) that can also be operated in the temperature range of liquid helium. The diodes employed do in fact satisfy the requirement to protect the cryomagnet from voltage excesses given a quench and to simultaneously minimize the heat generation given a charge or discharge of the magnetic coils. However, the employed arrangement of the diodes is not suitable to control a quench or to keep its propagation symmetrical.

Furthermore, quench protection circuits exist in which resistors and diodes are combined with one another, as are described in U.S. Pat. No. 6,147,844, for example. In such circuits resistive heating elements together with anti-parallel diodes are respectively connected in parallel with sub-coils. The heating elements are in thermal contact with the sub-coils so that the heat generated by a quench in a sub-coil is also transferred to other sub-coils. A quench in one sub-coil can thus be controlled in its propagation to the entire magnetic coil. Furthermore, short circuit currents are enabled by the diode circuits so that the sub-coils are protected from current and voltage excesses with severe local temperature increases.

A similarly designed quench protection circuit with which a superconducting magnetic coil or the shim coils thereof can be quenched in a safe manner is disclosed in U.S. Pat. No. 4,689,707. This circuit also includes heating elements and anti-parallel diodes that are arranged in parallel with sub-coils.

However, both shown circuits appear to be relatively complicated in terms of their construction due to the use of different electrical and electronic components.

SUMMARY OF THE INVENTION

An object of the present invention a superconducting magnetic coil with a circuit for quench protection in which problems described above in a quench and upon charging or discharging of the magnet can be avoided with a simple, cost-effectively produced circuit. Furthermore, it is an object of the invention to specify an MRT apparatus with such a superconducting coil.

The inventive superconducting magnetic coil with a circuit for quench protection has at least one diode that is arranged in parallel with a portion of the superconducting magnetic coil, wherein the at least one diode is in thermal contact with the superconducting magnetic coil.

With such a circuit, the portion of the superconducting magnetic coil with which the diode is connected in parallel can be protected from a voltage excess given a quench. The polarity of the diode is selected such that the portion of the magnetic coil is protected against a voltage excess that occurs given a decreasing current flow in the magnetic coil.

If a quench occurs in the part of the magnetic coil at which the diode is connected in parallel, this will typically generate a voltage at the part of the coil due to the current flow significantly decreasing in a relatively short span of time, according to $L \cdot (\partial I/\partial t)$ (L . . . inductivity of the part of the coil, I . . . current flow). Due to the rapid decrease of the current flow, this voltage is typically so high that the breakdown voltage of the diode is exceeded. This means that a large part of the magnet current flows through the diode and this is heated. Since the diode is in thermal contact with the superconducting magnetic coil, the thermal energy that arises upon current flowing through the diode is utilized in order to bring other, still superconductive parts of the magnetic coil to quench. A quench can thereby be expanded in a controlled manner to further parts of the magnetic coil.

An estimation of the amount of heat energy that can be emitted from a diode through which current flows is described in connection with the exemplary embodiment.

As is apparent from the above discussion, thermal contact between the at least one diode and the superconducting magnetic coil is a thermal contact in which the heat quantity transferred to the magnetic coil from the diode through which current flows is sufficient to bring parts of the magnetic coil to quench.

Since the quench propagation is now controlled with diodes instead of resistive heating elements (as was previously typical), helium losses upon charging, discharging or recharging of the magnetic coil that would occur given heating of the resistive heating elements by the applied voltage are minimized.

In a preferred embodiment the circuit has at least one further diode that is arranged in anti-parallel with the at least one diode. The anti-parallel arrangement of at least one further diode entails the advantage that the parts of the magnetic coil that would not be protected by the at least one diode can also be protected from voltage excesses.

For example, if a first diode is connected in parallel with the sub-coils of the magnetic coil in order to protect the sub-coils, a superconducting switch that closes the electrical circuit so that current can circulate through the sub-coils is not protected by the first diode from voltage excesses. The portion of the electrical circuit that is not protected by the first diode and that includes the superconducting switch is also protected from voltage excesses only by the arrangement of a second diode in an anti-parallel manner.

Due to the first additional diode arranged in anti-parallel with the first diode, the coil and possibly the superconducting switch are also protected even if the coil were (unintentionally or intentionally) charged with opposite polarity.

The at least one further diode is advantageously in thermal contact with the superconducting magnetic coil. A better control of the quench propagation in the magnetic coil can thereby be achieved. A quench of the superconducting switch that would likewise lead to a collapse of the magnetic flux can likewise be extended to the magnetic coil.

The thermal contact between diode and superconducting magnetic coil is preferably such that the thermal contact is a heat-conducting contact. This means that the majority of the heat that is transferred from the diode to the magnetic coil is transferred via a heat conductor.

The at least one diode and/or the at least one additional diode preferably contact the superconducting magnetic coil via an electrical insulator. The electrical insulator prevents current from passing from the electrical circuit of the magnetic coil into the diode in a normally-conductive operation of the magnetic coil.

The insulator can thereby consist of plastic, for example from polyimide (Kapton®) or polytetrafluorethylene (Teflon®) or even of a crystalline structure such as, for example, mica.

The at least one diode and/or the at least one additional diode are preferably designed with a disc shape. Such diodes are flat and have a large cross-sectional area via which comparably large quantities of heat energy can be emitted in a short time and be transferred to the magnetic coil. These diodes can additionally be applied on the magnetic coil in a manner that is advantageous in terms of design.

The electrical insulator via which the diode contacts the magnetic coil is correspondingly, advantageously also fashioned in a disc shape. In this manner it is achieved that the heat transfer from a diode to the magnetic coil occurs efficiently in spite of the insulator layer situated between them.

In a preferred embodiment, an additional layer made from a heat-conductive material is located between the insulator and the superconducting magnetic coil. A heat-conductive contact between a diode and a larger portion of the superconducting magnetic coil can now be produced with the use of the layer made from heat-conductive material. This is particularly useful when the magnetic coil comprises multiple sub-coils, as is typical. Here the diode can be applied, for example, in proximity to a sub-coil. So that the diode brings not only this sub-coil to quench but also others, the heat emitted by the diode can also be conducted to other sub-coils via the layer made from heat-conductive material. For this purpose, the layer made from heat-conductive material must merely be dimensioned correspondingly large so that it also contacts other sub-coils. This can be accomplished particularly simply if the sub-coils are spatially adjacent. However, spatially separated sub-coils can also thermally couple with one another if the layer made from heat-conductive material is applied in a bridge-like construction. Copper, for example, is suitable as a possible heat-conductive material.

The additional layer made from heat-conductive material is preferably surrounded at least in part by a heat insulator. The heat insulator can thereby be a plastic, for example fiber-reinforced epoxy resin or polytetrafluoroethylene (Teflon®) and has the effect that, with the layer made from heat-conductive material, a better heat transfer occurs between parts of the magnetic coil in the event of a quench since the layer made from heat-conductive material is thermally shielded from the liquid helium. No insulation is present at the contact points of the layer made from heat-conductive material with the magnetic coil.

The MR apparatus according to the invention is equipped with a superconducting magnetic coil with a circuit described above for quench protection.

DESCRIPTION OF THE PREFERRED EMBODIMENTS

Figure 1:
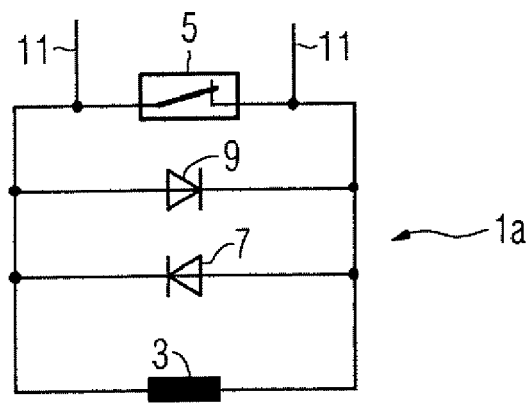
FIG. 1 schematically illustrates a superconducting magnetic coil with one sub-coil and two diodes connected in parallel with opposite polarity (anti-parallel).

FIG. 1 shows the basic design of a superconducting magnetic coil with two diodes connected in anti-parallel.

A diode circuit operated according to the principle presented in the following was used in a cryomagnet of the Helicon type from Siemens AG. In contrast to the design presented here, this magnetic coil does in fact comprise multiple sub-coils spatially separated from one another and multiple diodes connected in parallel for this; however, the principle design is not the same.

The primary component of the magnetic coil 1a is a sub-coil 3 with which the basic magnetic field is generated. If the magnetic coil 1a is located in an already-charged state, the current circulates without loss in the resistance-free superconducting conductor wires. As shown here the superconducting 5 is thereby in the closed state. The superconducting conductor wires typically are formed of a niobium-titanium alloy or a niobium-tin alloy with a copper jacket, such that they are superconductive at an operating temperature of liquid helium (4.2° K.)

If a portion of the magnetic coil 1a quenches, i.e. if a portion of the magnetic coil 1a becomes normally-conductive with finite resistance, the amplitude I changes relatively significantly within a short time such that, according to $L \cdot (\partial I / \partial t)$ (L . . . inductance of the magnetic coil), a comparably high voltage is applied to the conductor wires of the magnetic coil 1a. This voltage excess can lead to a damage to the conductor wires, in particular to their insulation made of copper.

This problem can be counteracted in that a first diode 7 is connected in parallel with the sub-coil 3, the polarity of which first diode 7 is selected such that it limits the arising voltage in the event of a collapse of the current flow. A second diode 9 is connected in anti-parallel with the first diode 7. Given a quench the second diode 9 protects the superconducting switch 5 from voltage excesses. Furthermore, due to the anti-parallel arrangement of the first diode 7 and the second diode 9 the magnetic coil 1a is also protected if the magnetic coil 1a was—intentionally or unintentionally—charged with an opposite polarity.

When the magnetic coil 1a is placed into operation, current must be fed into the superconducting wires of the magnetic coil 1a, which is generally designated as charging of the magnetic coil 1a. For this the superconducting switch 5 (that closes the electrical circuit of the magnetic coil 1a in the charged state) is opened and an external power source is connected to the magnetic coil 1a via mechanical plug connections 11. The magnetic coil 1a can be discharged or recharged in an analogous manner.

Upon charging a voltage of defined magnitude is applied at the plug connections 11. The transmission voltage of the two diodes 7, 9 is selected such that it is greater than the applied voltage. It is thus prevented that the charging current flows via the diodes 7, 9. If resistors were used instead of the two diodes 7, 9, these would in fact also offer a protection again voltage excesses; however, upon a discharging, recharging or charging of the magnetic coil 1a, current would flow through the resistors and heat these, which would lead to a vaporization of helium (which incurs a cost).

However, the design presented here with a parallel or, respectively, anti-parallel connection of diodes has proven to be problematic when the superconducting magnetic coil comprises multiple sub-coils. Given such a magnetic coil it can occur with such a circuit that a quench of one sub-coil does not transfer to the other sub-coils, such that on the one hand the one sub-coil is exposed to a high thermal load and on the other hand the quench would propagate asymmetrically.

Figure 2:
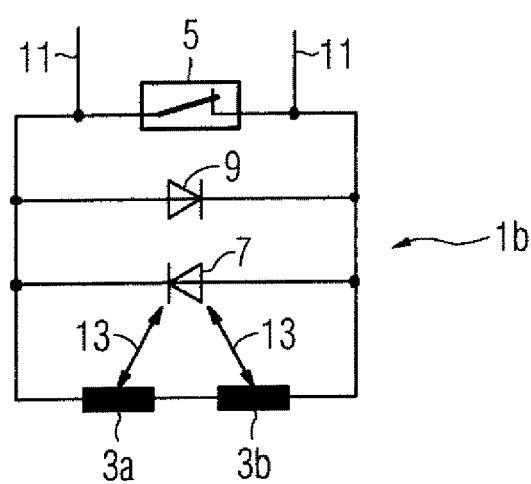
FIG. 2 schematically illustrates a superconducting magnetic coil having two sub-coils, with two diodes connected in parallel with opposite polarity, with one diode being in thermal contact with the two sub-coils.

The principle of the invention is explained using FIG. 2 in a superconducting magnetic coil 1b with two sub-coils 3a, 3b.

The magnetic coil 1b shown here has two sub-coils 3a, 3b spatially separated from one another and connected in series. A first diode 7 and a second diode 9 are connected in anti-parallel arrangement, in parallel with the sub-coils 3a, 3b. The two diodes 7, 9 correspond in terms of their functionality to the diodes described in FIG. 1.

Figure 3:
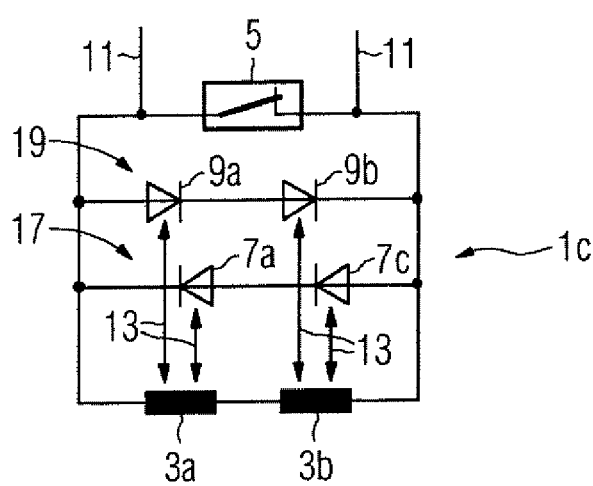
FIG. 3 schematically illustrates a superconducting magnetic coil having two sub-coils with two sets of diodes connected in parallel with opposite polarity, with the diodes in each set being in thermal contact respectively with the sub-coils.
Figure 4:
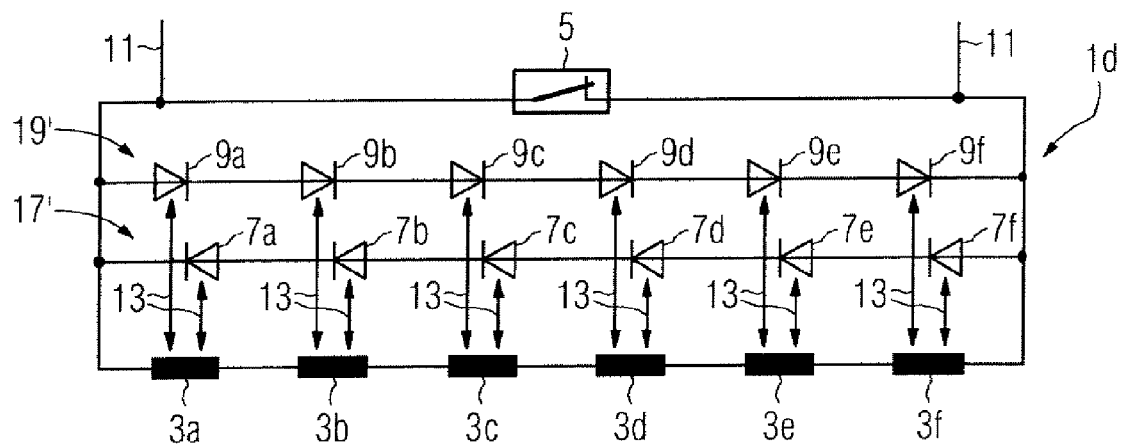
FIG. 4 schematically illustrates a superconducting magnetic coil of the type shown in FIG. 3, but with six sub-coils.
Figure 5:
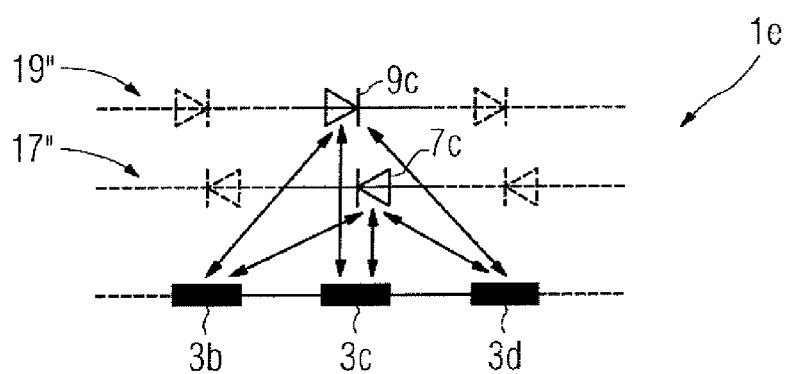
FIG. 5 is a section through a superconducting magnetic coil having multiple sub-coils with diode sets connected in parallel with opposite polarity, with the diodes in thermal contact with multiple sub-coils.

By contrast, however, the first diode 7 is fashioned such that it is in thermal contact with both sub-coils 3a, 3b, which is indicated by the double arrows 13 in FIG. 2 (and also in FIG. 3 through FIG. 5). For example, if the first sub-coil 3a is now quenched, due to the change of the current flow a voltage is induced that—given suitable selection of the first diode 7—is so great that it lies above the breakdown voltage. A current flow through the first diode 7 results. Due to this current flow the first diode 7 heats and, since it is also in thermal contact with the second sub-coil 3b, the second sub-coil 3b also passes above the transition temperature.

Given a quench of the first sub-coil 3a, the second coil 3b can also quench and vice versa in this manner. This means that the energy of the collapsing magnetic field is distributed to both sub-coils 3a, 3b, which leads to a slight thermal loading of both sub-coils 3a, 3b. Moreover, the quench now occurs in a symmetrical manner, which entails advantages with regard to the distribution of arising eddy currents and lateral displacement forces.

A following calculation of what heat output can be generated by a silicon diode given a quench should now be clarified in the example of said silicon diode. If the silicon diode is operated at the temperature of liquid helium (thus at temperatures of 4.2° K.), the silicon diode possesses a transmission voltage of 3 V and more. If the breakdown voltage is reached due to a quench, such that current flows through the silicon diode, it suddenly becomes warm and then possesses the known transmission voltage of 0.7 V (at room temperature). If a current of 100 A flows through the magnetic coil, at the beginning of the quench this current also flows through the silicon diode and generates a heat of approximately 70 W (=0.7 V·100 A). This energy is a multiple of the energy required to trigger a quench, such that with this heat multiple sub-coils can be brought to quench given a suitably designed embodiment of the thermal contact.

Figure 6:
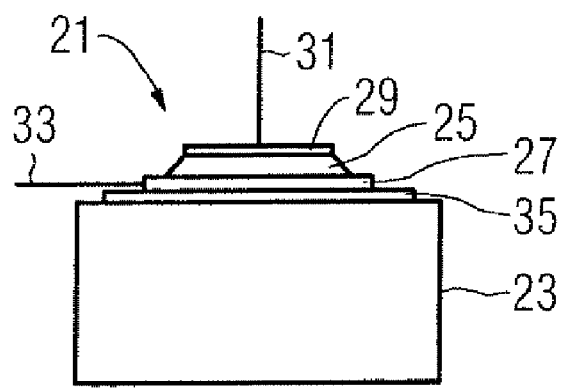
FIG. 6 schematically illustrates the design of a diode and a contact point with a sub-coil of a superconducting magnetic coil to produce a thermal contact.
Figure 7:
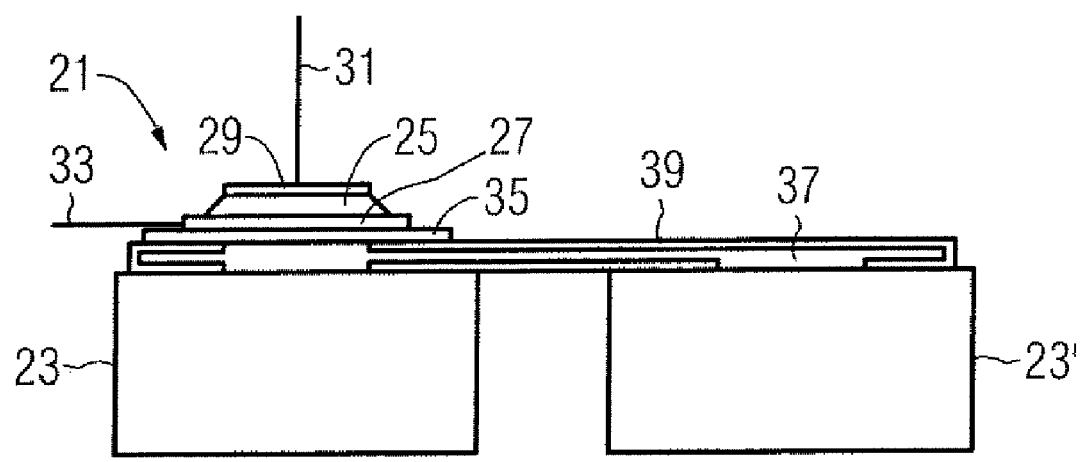
FIG. 7 schematically illustrates the design of a diode with a contact point with two sub-coils of a superconducting magnetic coil to produce a thermal contact of the diode with the two sub-coils.

Embodiments of this design arrangement are described layer using FIG. 6 and FIG. 7. The thermal contact of the sub-coils 3a, 3b with the diode 7 is a heat-conductive contact. This means that the majority of the heat energy that is transferred from a diode through which current flows to the magnetic coil 1b is transferred by means of heat output and not as radiant heat or by convection.

FIG. 3 shows a further embodiment of the circuit in a magnetic coil 1c that has two sub-coils 3a, 3b.

Here two diode chains 17, 19 connected in anti-parallel are arranged instead of the first and second diode 7, 9 from FIG. 2. With the use of multiple diodes 7a, 7b; 9a, 9b in a diode chain 17; 19, the transmission voltage can be increased so that a higher voltage can be applied to charge the sub-coils 3a, 3b.

In the example shown here, each of two diodes 17, 19 comprises two diodes 7a, 7b; 9a, 9b that are respectively in thermal contact with one of the two sub-coils 3a, 3b.

For example, if the first sub-coil 3a now quenches, the magnetic current will flow through the first diode chain 17 in the event that the arising voltage is greater than the breakdown voltage of the first diode chain 17. All diodes 7a, 7b of the first diode chain are hereby heated and bring the respective thermally connected sub-coils 3a, 3b to quench, such that the quench from the first sub-coil 3a also propagates to the second sub-coil 3b. The same would occur if the magnetic current were to have a polarity such that the magnetic current would flow through the second diode chain 19 given a quench.

A design analogous to FIG. 3 is shown in FIG. 4. The magnetic coil 1d shown here comprises six sub-coils 3a . . . 3f. Such a magnetic coil 1d is often used in an MRT apparatus to generate a homogeneous basic magnetic field. Here the two diode chains 17'; 19' respectively comprise six diodes 7a . . . 7f; 9 . . . 9f, of which each is in thermal contact with one of the respective sub-coils 3a . . . 3f.

If one of the sub-coils 3a . . . 3f now quenches, the quench passes to the other sub-coils analogous to the mechanism described in FIG. 3, such that the entire magnetic coil 1d is brought to quench. In this manner a quench of only a portion of the magnetic coil 1d is prevented, which would lead to a higher thermal loading of the portion and also would lead to strong lateral displacement forces due to a strong asymmetric induction of eddy currents.

FIG. 5 shows a further possibility of the induction of a quench propagation, depicted in a section from a magnetic coil 1e having multiple sub-coils 3b . . . 3d.

Here, in contrast to the exemplary embodiment shown in FIG. 4, the diodes 7c, 9c (singled out by way of example) of the two diode chains 17", 19", are in thermal contact with not only one sub-coil but rather with multiple sub-coils 3b . . . 3d. The number of the sub-coils 3b . . . 3d with which the diodes 7c, 9c are in thermal contact is thereby not necessarily limited to three.

The diodes 7c, 9c are advantageously in thermal contact with respective adjacent sub-coils 3b . . . 3d since this can be realized in terms of design in a simple manner, as described in the following in FIG. 7. However, this is not absolutely necessary.

FIG. 6 shows an embodiment of the thermal contact point between a silicon diode 21 and a superconducting coil 23.

The silicon layer 25 of the silicon diode 21 is applied on a carrier plate 27 that can consist of molybdenum, for example. A layer 29 of metal (for example of silver) is located on the silicon layer 25, via which layer 29 an electrical feed line 31 contacts the silicon diode 21. A further electrical feed line 33 contacts the silicon diode 21 via the carrier plate 27. At the same time pressure can be exerted via the layer 29, such that the diode 21 rests firmly on the coil 23. The electrical feed lines 31, 33 to the silicon diode 21 are normally-conductive.

A layer of an insulator 35 is arranged between the silicon diode 21 and the coil 23. The insulator 35 can be formed of a heat-conductive plastic, for example of polyimide (Kapton®) or polytetrafluoroethylene (Teflon®) or even of crystalline structures such as, for example, mica.

With this arrangement it is ensured that the heat energy is transferred to the coil 23 given a current flow through the silicon diode 21 and a heating of the silicon diode 21 connected with this.

FIG. 7 shows a further embodiment of the thermal contact point with which heat energy of the silicon diode 21 can be transferred to more than one sub-coil 23, 23'.

For this a further layer 37 of a good heat-conductive material (for example of copper) that is so large that it contacts more than one coil 23, 23' is located between the insulator 35 and the coils 23, 23'. It is thereby ensured that, given a heating of the silicon diode 21, the heat energy is conducted to all coils 23, 23' that are contacted by the further layer 37 of heat-conductive material.

A heat insulator 39 is located around the further layer 37 of a heat-conductive material. The heat insulator 39 can thereby be a plastic (for example fiber-reinforced epoxy resin or polytetrafluoroethylene (Teflon®) and has the effect that a better heat transfer between the sub-coils 23, 23' occurs with the further layer 37 of heat-conductive material in the event of a quench since the further layer 37 of heat-conductive material is thermally shielded from the environment of cold helium. No insulation is located at the contact points of the further layer 37 of heat-conductive material with the sub-coils 23 and 23' and with the silicon diode 21.

Spatially adjacent coils can be contacted particularly simply, but non-adjacent coils can also be contacted given corresponding design embodiment, for example via bridge-like constructions.

Although modifications and changes may be suggested by those skilled in the art, it is the intention of the inventor to embody within the patent warranted heron all changes and modifications as reasonably and properly come within the scope of his contribution to the art.

The invention claimed is:

1. A superconducting magnetic coil comprising:
   a superconducting magnetic coil comprised of superconducting material and configured for operation in a superconducting state; and
   a quench protection circuit comprising at least one diode electrically connected in parallel with a portion of said superconducting magnetic coil, and said at least one diode being in thermal contact with said superconducting magnetic coil said quench protection circuit, upon an occurrence of at least a partial quench of said superconducting magnetic coil, causing current to flow through said diode, said current flowing through said diode causing said diode to radiate heat that is transferred to said superconducting magnetic coil to operate in a non-superconducting state.

2. A superconducting magnetic coil arrangement as claimed in claim 1 wherein said quench protection circuit comprises at least one further diode connected in parallel, with opposite polarity, with said at least one diode.

3. A superconducting magnetic coil arrangement as claimed in claim 2 wherein said at least one further diode is also in thermal contact with said superconducting magnetic coil, said quench protection circuit also causing current to flow through said further diode upon said occurrence of said quench, said current flowing through said further diode causing said further diode to also radiate heat that is transferred to said superconducting magnetic coil.

4. A superconducting magnetic coil arrangement as claimed in claim 3 wherein said thermal contact of said at least one diode and said at least one further diode with said superconducting magnetic coil is a heat-conductive thermal contact.

5. A superconducting magnetic coil arrangement as claimed in claim 2 wherein said thermal contact for at least one of said at least one diode and said at least one further diode comprises an electrical insulator.

6. A superconducting magnetic coil arrangement as claimed in claim 5 wherein said at least one of said at lease one diode and said at least one further diode is formed as a disc, and wherein said electrical insulator is formed as a disc.

7. A superconducting magnetic coil arrangement as claimed in claim 5 wherein said thermal contact between said at least one of said at least one diode and said at least one further diode comprises a layer of heat-conductive material disposed between said electrical insulator and said superconducting magnetic coil.

8. A superconducting magnetic coil arrangement as claimed in claim 7 comprising a heat insulator surrounding said further layer of heat conductive material.

9. A superconducting magnetic coil arrangement as claimed in claim 1 wherein said thermal contact between said at least one diode and said superconducting magnetic coil is a heat-conductive thermal contact.

10. A magnetic resonance tomography apparatus comprising:
a data acquisition unit configured for interaction with an examination subject to acquire magnetic resonance data therefrom, said data acquisition unit comprising a superconducting magnetic coil comprised of superconducting material and configured for operation in a superconducting state; and
a quench protection circuit comprising at least one diode electrically connected in parallel with a portion of said superconducting magnetic coil, and said at least one diode being in thermal contact with said superconducting magnetic coil said quench protection circuit, upon an occurrence of at least a partial quench of said superconducting magnetic coil, causing current to flow through said diode, said current flowing through said diode causing said diode to radiate heat that is transferred to said superconducting magnetic coil to operate in a non-superconducting state.

11. A magnetic resonance tomography apparatus as claimed in claim 10 wherein said quench protection circuit comprises at least one further diode connected in parallel, with opposite polarity, with said at least one diode.

12. A magnetic resonance tomography apparatus as claimed in claim 11 wherein said at least one further diode is also in thermal contact with said superconducting magnetic coil, said quench protection circuit also causing current to flow through said further diode upon said occurrence of said quench, said current flowing through said further diode causing said further diode to also radiate heat that is transferred to said superconducting magnetic coil.

* * * * *